J. W. OMAN.
COMPRESSED AIR MOTOR.
APPLICATION FILED AUG. 1, 1914.
1,181,536.
Patented May 2, 1916.
5 SHEETS—SHEET 4.
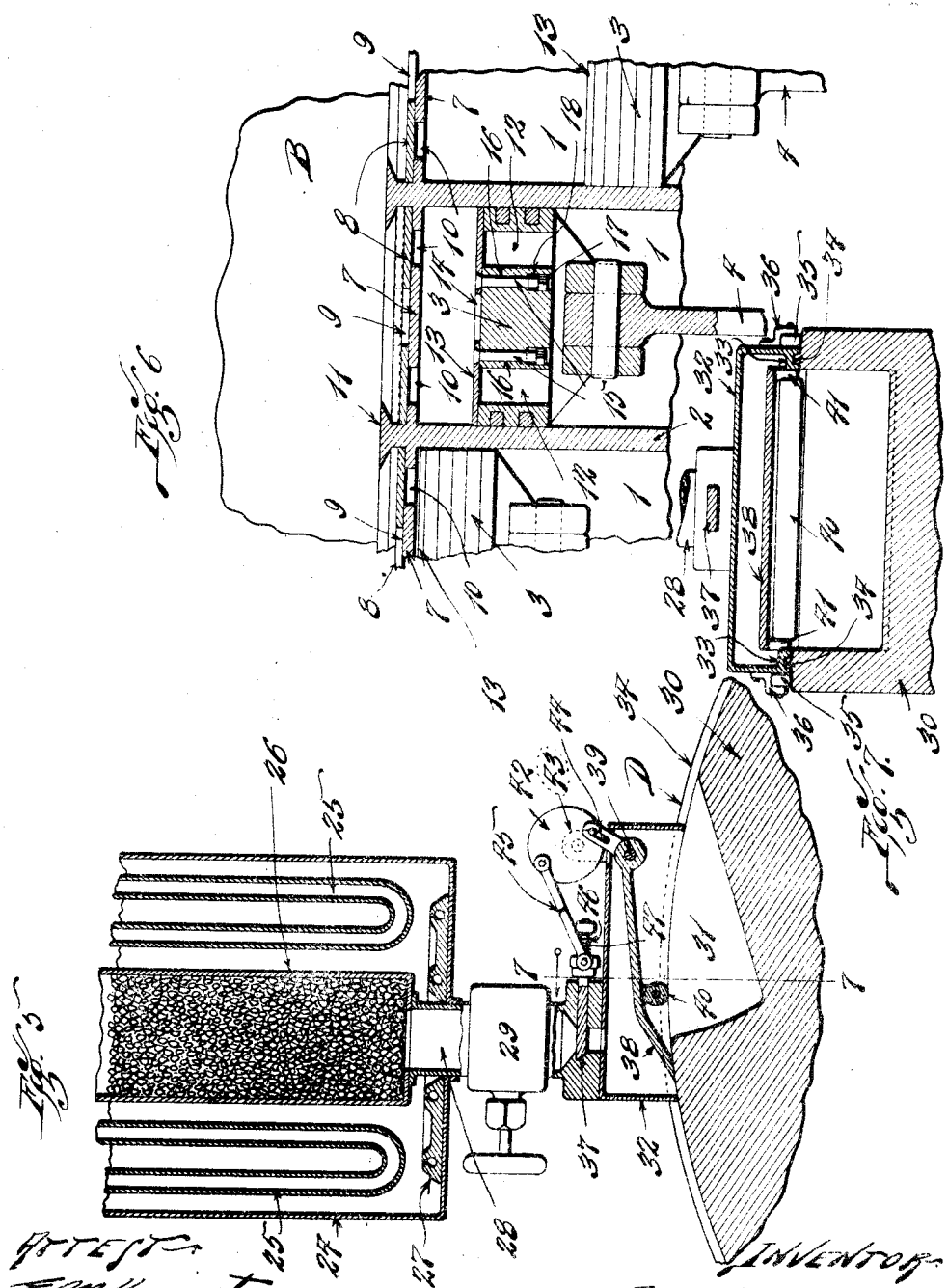

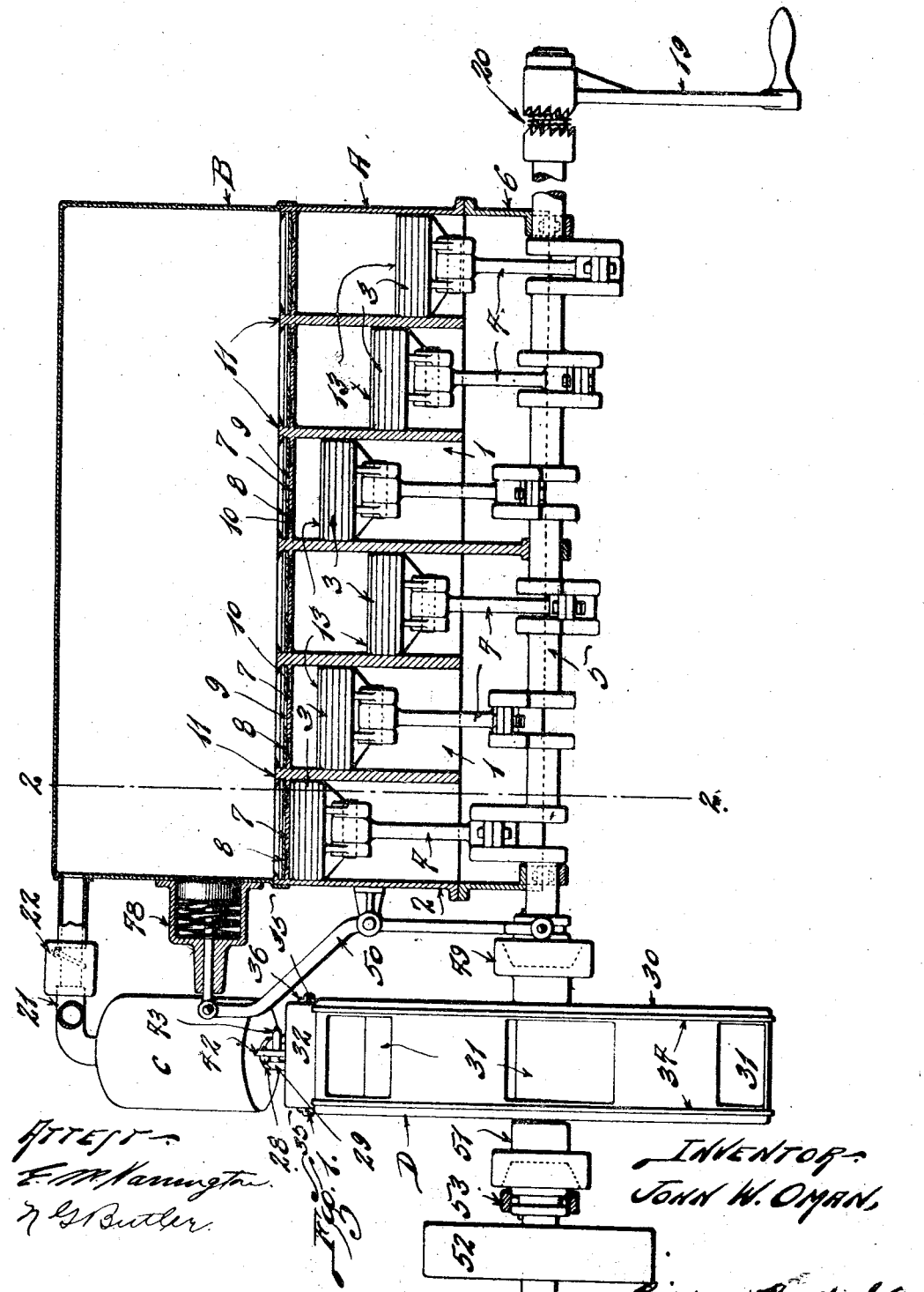

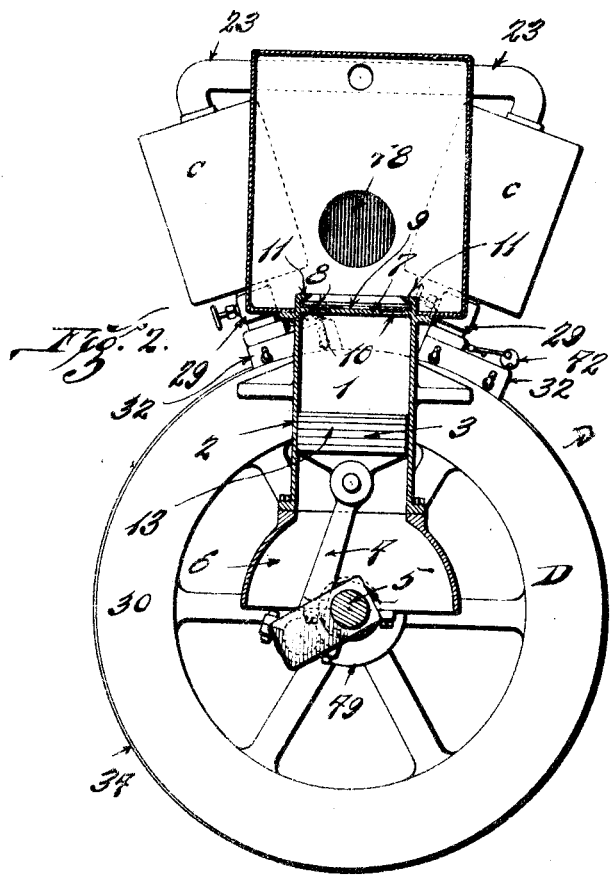

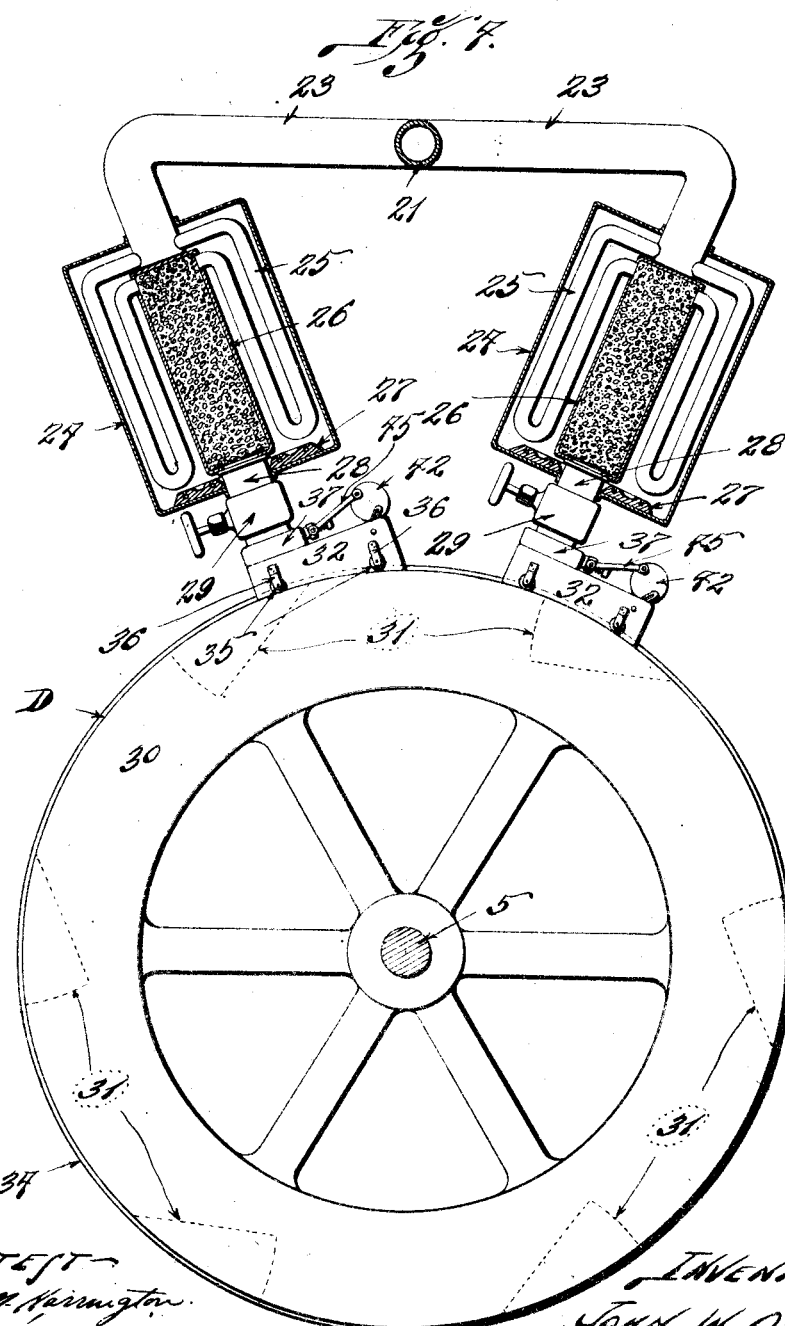

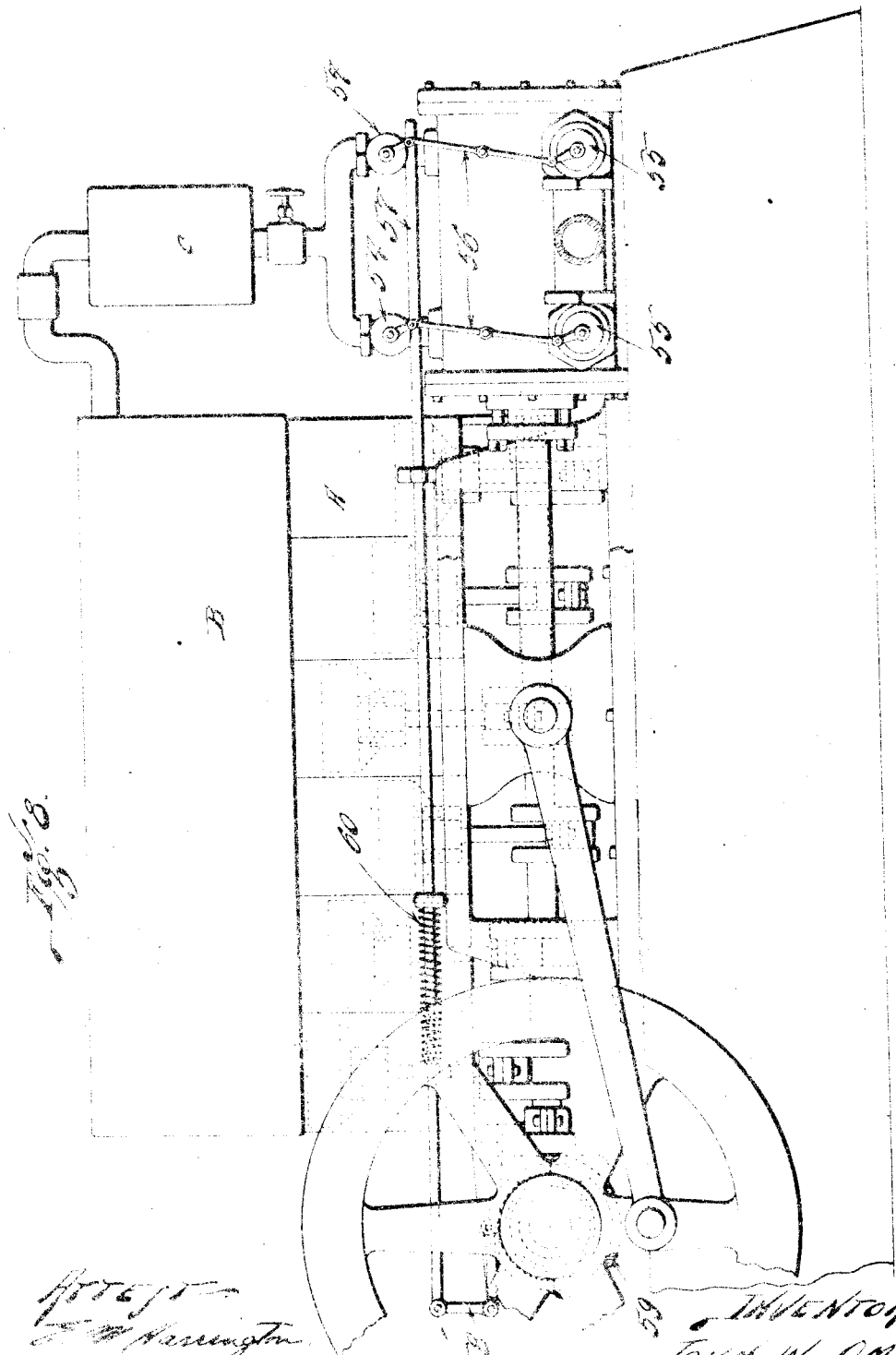

UNITED STATES PATENT OFFICE.

JOHN W. OMAN, OF ST. LOUIS, MISSOURI.

COMPRESSED-AIR MOTOR.

1,181,536.   Specification of Letters Patent.   Patented May 2, 1916.

Application filed August 1, 1914. Serial No. 854,440.

*To all whom it may concern:*

Be it known that I, JOHN W. OMAN, a citizen of the United States, residing at the city of St. Louis and State of Missouri, have invented a new and useful Compressed-Air Motor, of which the following is a specification.

This invention relates to motors and more particularly to a motor adapted to be driven by compressed air, with provision for expanding the air whereby a high pressure is produced and introducing charges of the operating fluid for driving the motor.

An object of the invention is to provide a power plant comprising an air compressor, in combination with an expansion chamber, and means for introducing charges of the expanded operating fluid at proper intervals into chambers whereby the motor is driven.

Another object of the invention is to provide a power plant comprising an air compressor operated by the power generated by the motor, in combination with an expansion chamber and the working cylinders of the motor, with connections for automatically controlling the passage of the operating fluid whereby charges thereof will be introduced into the working cylinders of the engine at proper intervals.

Other objects of my invention and the advantages to be attained therefrom will be apparent to those skilled in the art from the following detailed disclosure thereof, taken in connection with the accompanying drawings, in which I have illustrated an embodiment of my invention.

Figure 1 is a vertical section through the air compressor and tank; the rotor, containing the working cylinders, as well as the expansion chamber being shown in elevation. Fig. 2 is a transverse section taken substantially on the line 2—2 of Fig. 1. Fig. 3 is a plan view of the air compressor unit, a part of the upper housing being broken away showing more clearly the interior construction of certain of the pumps. Fig. 4 is an enlarged view of the rotor element shown in elevation and the expansion chambers shown in section, together with the pipe connections and automatically controlled valve for the admission of the operating fluid to the working cylinders of the rotor. Fig. 5 is a vertical section through a fragment of the rotor and one of the expansion chambers, together with a sectional view of the mechanism for the admission of the operating fluid to the rotor. Fig. 6 is a section of the compressor showing the arrangement of the valves in the pump pistons, and the valves between the pumps and the air tank in connection with the compressor. Fig. 7 is a transverse section substantially on the line 7—7 of Fig. 5; and, Fig. 8 is a side elevation of a reciprocating engine illustrating the application of my invention for the operation of this type of motor.

In the embodiment of my invention illustrated in the drawings, the compressor A comprises a plurality of pump cylinders 1 adjacently arranged in a housing 2. Pistons 3 are operatively mounted in said cylinders 1 and are operatively connected by connecting-rods 4 to a crank-shaft 5. The shaft 5 is journaled in an open crank-case 6 arranged below the cylinder housing 2. The lower end of each of said pump cylinders is open and the opposite end is provided with uniformly arranged valves comprising matching plates 7 and 8. Each of the plates 8 is provided with a central port 9 and each of the plates 7 is provided with ports 10 which are staggered with respect to the port 9.

Each of the plates 8 is mounted to slide vertically in the space provided by the flanged retaining-rings 11, sufficient movement of the plates 8 being permitted for the admission of pressure from the upper part of the pump cylinders 1 through the ports 9 and 10 to the container or tank B disposed above said pumps. Thus, it will be apparent that the arrangement of the valves between the compressor A and the tank B is such that, when the pistons 3 are driven upwardly, the valves at the top of the cylinders will open and admit the pressure generated by the pumps to the tank. The arrangement of the parts just described will be most clearly apparent by reference to Fig. 6 of the drawings.

Each of the pistons 3 is formed with a plurality of openings 12 therethrough, said openings being controlled by a valve in the form of a plate 13 having an axial port 14 arranged therein. The plates 13 are mounted on the top of the pistons 3 and are retained from displacement and limited in movement with respect to the pistons by a plurality of rods 15 mounted to slide in channels 16 formed in the pistons. The lower ends of the rods 15 are provided with enlarged heads 17 operating in enlarged recesses 18 at the ends of the channels 16, whereby the upward movement of the plates 13 is limited.

It will be apparent that, when the pistons travel downwardly, a charge of air through the crank-case will pass through the openings 12, raising the plate 13 and opening the port 14, whereby the charge is introduced above the pistons 3, and that upon the upward stroke of the piston the plate 13 will be reseated thereby closing the port 14, the charge in the upper end of the piston being compressed and introduced into the tank in a manner hereinbefore described.

For the purpose of manually operating the crank-shaft 5 for introducing an initial pressure into the tank B, I provide a crank-arm 19 attached to one end of said crank-shaft, with which it may be operatively engaged by a clutch device 20, of known construction. The tank B is of any desired construction and capacity and is adapted to contain a quantity of air under a substantial degree of compression. The passage 21 establishes communication between the tank B and the expansion chambers C, said passage 21 being controlled by a check-valve 22 operating outwardly from the tank B.

When the invention is embodied in a rotary engine or turbine it is preferred to provide two expansion chambers C disposed on radial lines with respect to the rotor, as clearly illustrated in Fig. 4 of the drawings. In such an embodiment the passage 21 is provided with branches 23 which communicate with the expansion chambers C, respectively. Each expansion chamber C comprises a case or housing 24 in which are disposed coils 25 which communicate at one end with the pipes or passages 23, said pipes or passages extending through one end of the housings 24. The opposite ends of the coils 25 enter chambers 26 incased within the housings 24. The chambers 26 are supplied with a quantity of steel filings, or other material adapted for heat radiation and through which the air introduced into the chambers 26 through the coils 25 may pass.

Arranged within the housings 24 are burners 27 which are provided with a plurality of jets for heating the interior of the expansion chamber, and thereby the coils 25 and the contents of the chambers 26. Thus, it will be apparent that the air introduced into the expansion chambers through the pipes 23 under compression will be heated as it passes through the coils 25 and the chambers 26 to a considerable degree, whereby the degree of pressure will be greatly increased. The expanded air exits from the expansion chambers through passages 28 which are controlled by globe valves 29 from which the expanded air is automatically admitted to the working compartments of the rotor by means of the mechanism clearly illustrated in detail in Fig. 5 of the drawings, which mechanism will be hereinafter more particularly described.

The rotor D comprises a wheel 30 in the periphery of which is formed a plurality of recesses 31 constituting the working compartments. The housings 32 of the fluid injecting mechanisms are adapted to rest on the periphery of the rotor and are provided with interiorly arranged grooves 33 which are adapted to coöperate with annular tongues 34 formed on the periphery of the rotor at either side of the recesses 31, thereby constituting a seal between the adjacent edges of the housings 32 and the periphery of the rotor. Anti-friction devices in the form of rollers 35 supported by brackets 36, said rollers being adapted to ride on the periphery of the rotor D, may be provided if desired. Communication between each of the housings 32 and the respective passages 28 when the globe valves 29 are open, is automatically controlled by a slide-valve 37 actuated from the plate 38 which plate is adapted to ride on the periphery of the rotor. The plate 38 is secured to a rock-shaft 39 supported by the side walls of the housing 32 and is adapted to seat in and rise out of the recesses 31 as the rotor operates, the free end following the contour of the rotor within the recess. The under side of the plate 38 is provided with a roller 40 supported by brackets 41 secured thereto. The forward end of the plate 38 is disposed obliquely downwardly as clearly illustrated in Fig. 5 of the drawings, the edge thereof engaging with the surface of the rotor within the recess.

An eccentric 42 is mounted on a bracket 43 which is secured to the upper face of the housing 32. A connecting-rod 44 provides means for actuating the eccentric 42 from the rock-shaft 39. A link 45 connects the slide-valve 37 with the eccentric 42 and provides means for opening the valve whenever the plate 38 lowers into a recess 31. An expansion spring 46 encircling a stem 47 connected to the valve 37 constitutes a shock absorber when the valve is opened and provides means for assisting in restoring the valve to closed position.

It will be apparent from the foregoing description that the expanded air, passing into the housing 32 above the plate 38 when said plate has dropped into one of the recesses 31, thereby opening the valve 37, will impinge against the end walls of the recesses 31 and, as the tendency of the air is to expand with great force, the rotor will be driven thereby.

The arrangement of the duplicate fluid injecting devices is such that charges will be alternately forced into the recesses 31, the respective valves 37 of the duplicate injecting devices being so arranged as to open alternately. A constant force will thus be applied to the periphery of the rotor tangentially to its axis and will, thereby, cause the same to revolve at a speed and with a power proportionate to the force of the expanding air.

In order to control the degree of pressure within the tank B, I provide a valve 48 adapted to operate a clutch 49 through the arm 50 for disconnecting the compressor from the source of power when a predetermined limit of pressure has been reached in the tank. The operation of this valve will be clearly apparent without further detailed disclosure thereof. The rotor D is adapted to drive a power-shaft 51 which may be connected to a driven wheel 52 by means of a cone-clutch construction 53, of known design.

In Fig. 8 of the drawings, I have shown my invention adapted for use in connection with a reciprocating engine. In this embodiment the compressor A, the tank B and the expansion chamber C are of the same construction and design as hereinbefore described. The engine comprises the usual cylinder, piston, piston rod, cross head and connecting rod, and is adapted to drive the fly wheel in the usual manner by reciprocation of the piston within the cylinder. Suitable gear connections between the fly wheel and the crank-shaft are provided for driving the pumps. After the air has passed from the expansion chamber it is delivered alternately to the opposite sides of the piston through valves 54, and the exhaust from the opposite sides of the piston are controlled by the valves 55. The arrangement of the valve arms of the valves 54 and 55 are such that when one of the valves 54 at one end of the cylinder is open the valve 55 at the opposite end of the cylinder is also open, the valves being connected by oscillating levers 56. A push-rod 57 is operated in one direction by a bell-crank lever 58 which coöperates with a cam 59 carried by the hub of the fly wheel and is moved in the opposite direction by a spring 60. These connections provide means for movement of the valves in a manner that will be clearly apparent. Thus, it will be seen that the present invention may be readily adapted for driving a reciprocating engine, and this adaptation I consider to be within the scope of my invention.

From the foregoing it will be readily understood that an engine constructed according to the principle of the present invention, may be operated at a very low fuel cost. The consumption of fuel is limited to that required for maintaining a heat within the expansion chamber sufficient to expand the compressed air generated by the air compressor.

I am aware that other adaptations of the invention may be made and that the details of construction may be varied without departing from the spirit or scope of the invention. I do not limit myself therefore to the exact disclosures, but

What I claim and desire to secure by Letters Patent is:—

1. A motor comprising a main shaft, a rotor rigidly mounted on said shaft provided with a series of recesses constituting working compartments arranged in the periphery thereof, a compressor driven by said main shaft, a tank in communication with said compressor, a heated chamber in communication with said tank constituting an expansion chamber, and a valve automatically operated by the movement of said rotor for delivering measured charges from said expansion chamber to the working compartments of said rotor successively, effectively to drive said rotor.

2. A motor comprising a main shaft, a rotor rigidly mounted on said shaft, a series of angular recesses in the periphery of said rotor, a housing mounted above said rotor, a movable plate in said housing, a heated expansion chamber, a passage from said expansion chamber to said housing, and a valve in said passage operated by said movable plate effectively to deliver measured charges of the actuating fluid from said expansion chamber to said recesses in succession effectively to drive said rotor.

3. A motor comprising a rotor mounted upon the main shaft of the motor, a series of angular recesses in the periphery of said rotor, a chamber mounted above said rotor, a movable plate adapted to operate in said recesses, an expansion chamber above said first-named chamber, a passage between said chambers, a valve in said passage, connections between said valve and said movable plate adapted to operate said valve, and means for delivering a continuous supply of compressed air to said expansion chamber, substantially as specified.

4. A motor comprising a main shaft, a wheel on said shaft provided with a series of pockets in its periphery, a compressor driven by the main shaft, a tank in communication with the compressor, an expansion chamber in communication with said tank, heat generating means inclosed in said expansion chamber, a passage from said expansion chamber adapted to deliver charges of the actuating fluid from said expansion chamber to said recesses, and an automatically operated valve in said passage, substantially as specified.

5. A motor comprising a rotary working part, a series of working chambers formed in said working part, a compressor driven by said working part, a tank in communication with said compressor, an expansion chamber, means for delivering heat to said expansion chamber, and automatic means for delivering charges of the actuating fluid from said expansion chamber to the compartments in said working part, whereby the same may be driven, substantially as specified.

6. A power plant, comprising a compressor composed of a plurality of pump elements, a tank in connection with all of said pump elements, automatically controlled valves between said pump elements and said tank, expansion chambers in communication with said tank, a rotor, and automatic means for delivering charges of the actuating fluid from said expansion chamber to said rotor, whereby the same is driven, substantially as specified.

7. In an engine, a main shaft, a driving element for driving said main shaft, a compressor operatively connected to said main shaft, a tank, an expansion chamber, a valved passage between said tank and said expansion chamber, and automatic means for delivering charges from said expansion chamber for actuating said driving element, substantially as specified.

8. An engine, comprising a main shaft, means for driving said shaft, a compressor, a clutch device between said compressor and said main shaft, a tank in communication with said compressor, an expansion chamber in communication with said tank, automatic means operated by the pressure in said tank for controlling said clutch, and automatic means controlling the passage of the actuating fluid from said expansion chamber to said driving means, substantially as specified.

9. An engine, comprising a main shaft, a compressor operatively connected to said main shaft, manual means for operating said compressor, a tank in communication with said compressor, a pair of expansion chambers, a rotor mounted on said main shaft, and means for alternately admitting pressure from said expansion chambers to said rotor, whereby the same is driven, substantially as specified.

10. An engine, comprising a main shaft, a rotor provided with a series of chambers in the periphery thereof, a compressor, a tank for containing the fluid generated by said compressor, an expansion chamber, and means for admitting charges from said expansion chamber to the chambers in said rotor, whereby said rotor is driven, substantially as specified.

In witness whereof, I have signed this specification in the presence of two subscribing witnesses.

JOHN W. OMAN.

Witnesses:
K. R. McDonald,
L. C. Kingsland.